(12) United States Patent
Fang et al.

(10) Patent No.: US 12,067,197 B2
(45) Date of Patent: Aug. 20, 2024

(54) TOUCH CONTROL SCREEN, SCREEN MODULE, AND ELECTRONIC DEVICE

(71) Applicant: HUAWEI TECHNOLOGIES CO., LTD., Guangdong (CN)

(72) Inventors: Gang Fang, Dongguan (CN); Qiang Wang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 3 days.

(21) Appl. No.: 17/666,818

(22) Filed: Feb. 8, 2022

(65) Prior Publication Data
US 2022/0164044 A1 May 26, 2022

Related U.S. Application Data

(63) Continuation of application No. PCT/CN2020/107740, filed on Aug. 7, 2020.

(30) Foreign Application Priority Data

Aug. 9, 2019 (CN) .......................... 201910734938.9

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04102* (2013.01)

(58) Field of Classification Search
CPC ........ G06F 3/044; G06F 3/0412; G06F 3/041; G06F 2203/04111; G06F 2203/04103; G06F 2203/04102
See application file for complete search history.

(56) References Cited

U.S. PATENT DOCUMENTS

| 9,582,087 B2 | 2/2017 | Kang |
| 2010/0201662 A1 | 8/2010 | Yamazaki et al. |
| 2016/0231837 A1* | 8/2016 | Baek ...................... G09G 3/035 |
| 2018/0052493 A1* | 2/2018 | Hong ................. H10K 50/8426 |

(Continued)

FOREIGN PATENT DOCUMENTS

| CN | 102016770 A | 4/2011 |
| CN | 102858080 A | 1/2013 |

(Continued)

OTHER PUBLICATIONS

Li Ju-peng et al, Smooth tracking with a kalman filter algorithm for capacitive touch panels, 2018,7 pages.

*Primary Examiner* — Hong Zhou
(74) *Attorney, Agent, or Firm* — WOMBLE BOND DICKINSON (US) LLP (57) ABSTRACT

This application provides a touch control screen, a screen module, and an electronic device. An end portion of a groove that is in a conducting layer of the touch control screen and whose component of length is greater than 0 on a y-axis is extended. This can reduce stress concentration at the end portion of the groove, thereby improving reliability of a capacitive touch control screen. In addition, the touch control screen in this application can be prepared simply by designing a pattern of a mask in advance. This features ease of operation and rapid deployment and is very practical.

20 Claims, 7 Drawing Sheets

(56) References Cited

U.S. PATENT DOCUMENTS

| | | | | |
|---|---|---|---|---|
| 2019/0143631 A1* | 5/2019 | Zhang | ............... | B32B 3/266 |
| | | | | 428/138 |
| 2019/0179439 A1* | 6/2019 | Feng | ............... | G06F 3/0448 |
| 2019/0243491 A1 | 8/2019 | Tsai et al. | | |
| 2019/0363266 A1* | 11/2019 | Tanaka | ............ | H10K 59/131 |
| 2020/0119113 A1* | 4/2020 | Lee | ............... | H10K 50/8445 |
| 2021/0223883 A1* | 7/2021 | Xu | ............ | G06F 3/0443 |

FOREIGN PATENT DOCUMENTS

| | | | |
|---|---|---|---|
| CN | 104932750 | A | 9/2015 |
| CN | 105554198 | A | 5/2016 |
| CN | 106415461 | A | 2/2017 |
| CN | 206332028 | U | 7/2017 |
| CN | 206400960 | U | 8/2017 |
| CN | 107690610 | A | 2/2018 |
| CN | 208488919 | U | 2/2019 |
| CN | 109690662 | A | 4/2019 |
| CN | 110570759 | A | 12/2019 |
| WO | 2018058299 | A1 | 4/2018 |
| WO | 2019061016 | A1 | 4/2019 |

* cited by examiner

TOUCH CONTROL SCREEN, SCREEN MODULE, AND ELECTRONIC DEVICE

CROSS-REFERENCE TO RELATED APPLICATIONS

This application is a continuation of International Application No. PCT/CN2020/107740, filed on Aug. 7, 2020, which claims priority to Chinese Patent Application No. 201910734938.9, filed on Aug. 9, 2019. The disclosures of the aforementioned applications are hereby incorporated by reference in their entireties.

TECHNICAL FIELD

This application relates to the field of touch control screen technologies, and more specifically, to a touch control screen, a screen module, and an electronic device.

BACKGROUND

In electronic apparatuses such as personal digital assistants, notebook computers, and medical apparatuses, touch control screens are widely applied. A touch control screen includes a transparent conducting layer with a graphical design, and can implement a touch control effect and a display effect.

Currently, flexible display technologies are developing rapidly. Especially, a touch control solution to a folding scenario is of great importance. An area that can be flexibly bent in a foldable electronic device can be referred to as a bending area. When the electronic device is bent, film dislocation and internal stress occur in the bending area, and a transparent conducting layer in the bending area is prone to break, causing a line in the transparent conducting layer to disconnect or impedance to increase. Ultimately, a touch control effect of a touch control screen worsens or directly becomes ineffective, seriously compromising reliability of the touch control screen.

SUMMARY

This application provides a touch control screen, a screen module, and an electronic device. An end portion of a groove that is in a conducting layer of the touch control screen and whose component of length is greater than 0 on a y-axis is extended, where the y-axis is perpendicular to a bending axis. This reduces stress concentration at the end portion of the groove, thereby improving reliability of the touch control screen. In addition, the touch control screen in this application can be prepared simply by designing a pattern of a mask in advance. This features ease of operation and rapid deployment and is very practical.

According to a first aspect, a touch control screen is provided. The touch control screen can be bent along a bending axis. The touch control screen includes a conducting layer, the conducting layer includes a plurality of first grooves, the first groove includes a main slot and a first extension slot, the first extension slot is connected to a first end portion of the main slot, a component of a length of the main slot is greater than 0 in a direction in which the bending axis is located, a length of a projection of the first extension slot on an x-axis is greater than a length of a projection of the first end portion on the x-axis, the x-axis is perpendicular to the bending axis, and a plane in which the x-axis and the bending axis are located is a plane in which a surface of the touch control screen is located.

Therefore, in the touch control screen provided in this application, an extension slot that can be connected to the main slot is provided at an end portion of the main slot, so that a length of a projection of the extension slot on the x-axis can be greater than a length of a projection, on the x-axis, of the end portion that is of the main slot and that is connected to the extension slot, where the x-axis is perpendicular to the bending axis. In this way, when the touch control screen is subject to tensile force from the x-axis in a bending process, stress originally concentrated on the relatively small end portion of the main slot is distributed to the relatively large extension slot, thereby reducing stress exerted on a single force bearing point on the extension slot that serves as an end portion of the first groove. This can effectively reduce stress concentration at the end portion of the first groove, thereby reducing a probability that the conducting layer breaks and improving reliability of the touch control screen. In addition, the touch control screen in this application can be prepared simply by designing a pattern of a mask in advance. This features ease of operation and rapid deployment and is very practical.

In an embodiment, the length of the projection of the first extension slot on the x-axis is greater than or equal to 1.5 times the length of the projection of the first end portion on the x-axis.

In an embodiment, at least a part of a slot wall of the first extension slot is an arc-shaped slot wall.

Therefore, in the touch control screen provided in this application, the arc-shaped inner wall is provided in the extension slot. This can reduce stress concentration in a local range caused by a sudden change of a shape of the extension slot.

In an embodiment, the arc-shaped slot wall is formed based on a chamfer design.

In an embodiment, the extension slot includes a chamfer, and the arc-shaped slot wall is an outer wall of the chamfer.

In an embodiment, a curvature radius of the arc-shaped slot wall is greater than 0.5 times a width of the first end portion.

In an embodiment, a width direction of the first extension slot is perpendicular to the bending axis.

Therefore, in the touch control screen provided in this application, the extension slot that extends in a direction perpendicular to a direction of the bending axis is provided at the end portion of the main slot. In this way, stress originally concentrated on the relatively small end portion of the main slot can be distributed to the relatively large extension slot to a relatively large degree. This can better reduce stress concentration at the end portion of the first groove, thereby reducing a probability that the conducting layer breaks and improving reliability of the touch control screen.

In an embodiment, the first groove further includes a second extension slot, the second extension slot is connected to a second end portion of the main slot, and a length of a projection of the second extension slot on the x-axis is greater than a length of a projection of the second end portion on the x-axis.

In an embodiment, the length of the projection of the second extension slot on the x-axis is greater than or equal to 1.5 times the length of the projection of the second end portion on the x-axis.

In an embodiment, at least a part of a slot wall of the second extension slot is an arc-shaped slot wall.

In an embodiment, the arc-shaped slot wall is formed based on a chamfer design.

In an embodiment, the extension slot includes a chamfer, and the arc-shaped slot wall is an outer wall of the chamfer.

In an embodiment, a curvature radius of the arc-shaped slot wall is greater than 0.5 times a width of the second end portion.

In an embodiment, a width direction of the second extension slot is perpendicular to the bending axis.

In an embodiment, a length direction of the main slot is parallel to the direction of the bending axis.

In an embodiment, a component of the length of the main slot is equal to 0 in a direction in which the x-axis is located.

In an embodiment, the conducting layer is a transparent conducting film layer.

According to a second aspect, a touch control screen is provided. The touch control screen can be bent along a bending axis. The touch control screen includes a conducting layer; the conducting layer includes a plurality of first grooves; the first groove includes a first end portion, a second end portion, and a main body portion that is located between the first end portion and the second end portion; a length of a projection of the first end portion on an x-axis is greater than a length of a projection, on the x-axis, of a part that is of the main body portion and that is in contact with the first end portion; a length of a projection of the second end portion on the x-axis is greater than a length of a projection, on the x-axis, of a part that is of the main body portion and that is in contact with the second end portion; the x-axis is perpendicular to the bending axis; and a plane in which the x-axis and the bending axis are located is a plane in which a surface of the touch control screen is located.

According to a third aspect, a screen module is provided, including a flexible display screen, a touch control screen, and a cover that are disposed in sequence in a stacking manner. The touch control screen includes a conducting layer, the conducting layer includes a plurality of first grooves, the first groove includes a main slot and a first extension slot, the first extension slot is connected to a first end portion of the main slot, a component of a length of the main slot is greater than 0 in a direction in which a bending axis is located, a length of a projection of the first extension slot on an x-axis is greater than a length of a projection of the first end portion on the x-axis, the x-axis is perpendicular to the bending axis, and a plane in which the x-axis and the bending axis are located is a plane in which a surface of the touch control screen is located.

In an embodiment, the length of the projection of the first extension slot on the x-axis is greater than or equal to 1.5 times the length of the projection of the first end portion on the x-axis.

In an embodiment, at least a part of a slot wall of the first extension slot is an arc-shaped slot wall.

In an embodiment, the arc-shaped slot wall is formed based on a chamfer design.

In an embodiment, the extension slot includes a chamfer, and the arc-shaped slot wall is an outer wall of the chamfer.

In an embodiment, a curvature radius of the arc-shaped slot wall is greater than 0.5 times a width of the first end portion.

In an embodiment, a width direction of the first extension slot is perpendicular to the bending axis.

In an embodiment, the first groove further includes a second extension slot, the second extension slot is connected to a second end portion of the main slot, and a length of a projection of the second extension slot on the x-axis is greater than a length of a projection of the second end portion on the x-axis.

In an embodiment, the length of the projection of the second extension slot on the x-axis is greater than or equal to 1.5 times the length of the projection of the second end portion on the x-axis.

In an embodiment, at least a part of a slot wall of the second extension slot is an arc-shaped slot wall.

In an embodiment, the arc-shaped slot wall is formed based on a chamfer design.

In an embodiment, a curvature radius of the arc-shaped slot wall is greater than 0.5 times a width of the second end portion.

In an embodiment, a width direction of the second extension slot is perpendicular to the bending axis.

In an embodiment, a length direction of the main slot is parallel to the direction of the bending axis.

In an embodiment, a component of the length of the main slot is equal to 0 in a direction in which the x-axis is located.

In an embodiment, the conducting layer is a transparent conducting film layer.

According to a fourth aspect, a screen module is provided, including a flexible display screen, a touch control screen, and a cover that are disposed in sequence in a stacking manner. The touch control screen is bent along a bending axis. The touch control screen includes a conducting layer; the conducting layer includes a plurality of first grooves; the first groove includes a first end portion, a second end portion, and a main body portion that is located between the first end portion and the second end portion; a length of a projection of the first end portion on an x-axis is greater than a length of a projection, on the x-axis, of a part that is of the main body portion and that is in contact with the first end portion; a length of a projection of the second end portion on the x-axis is greater than a length of a projection, on the x-axis, of a part that is of the main body portion and that is in contact with the second end portion; the x-axis is perpendicular to the bending axis; and a plane in which the x-axis and the bending axis are located is a plane in which a surface of the touch control screen is located.

According to a fifth aspect, an electronic device is provided, including a bending axis and a screen module. The screen module can be bent along the bending axis. The screen module includes a flexible display screen, a touch control screen, and a cover that are disposed in sequence in a stacking manner. The touch control screen includes a conducting layer, the conducting layer includes a plurality of first grooves, the first groove includes a main slot and a first extension slot, the first extension slot is connected to a first end portion of the main slot, a component of a length of the main slot is greater than 0 in a direction in which the bending axis is located, a length of a projection of the first extension slot on an x-axis is greater than a length of a projection of the first end portion on the x-axis, the x-axis is perpendicular to the bending axis, and a plane in which the x-axis and the bending axis are located is a plane in which a surface of the touch control screen is located.

In an embodiment, the length of the projection of the first extension slot on the x-axis is greater than or equal to 1.5 times the length of the projection of the first end portion on the x-axis.

In an embodiment, at least a part of a slot wall of the first extension slot is an arc-shaped slot wall.

In an embodiment, the arc-shaped slot wall is formed based on a chamfer design.

In an embodiment, a curvature radius of the arc-shaped slot wall is greater than 0.5 times a width of the first end portion.

In an embodiment, a width direction of the first extension slot is perpendicular to the bending axis.

In an embodiment, the first groove further includes a second extension slot, the second extension slot is connected to a second end portion of the main slot, and a length of a projection of the second extension slot on the x-axis is greater than a length of a projection of the second end portion on the x-axis.

In an embodiment, the length of the projection of the second extension slot on the x-axis is greater than or equal to 1.5 times the length of the projection of the second end portion on the x-axis.

In an embodiment, at least a part of a slot wall of the second extension slot is an arc-shaped slot wall.

In an embodiment, the arc-shaped slot wall is formed based on a chamfer design.

In an embodiment, a curvature radius of the arc-shaped slot wall is greater than 0.5 times a width of the second end portion.

In an embodiment, a width direction of the second extension slot is perpendicular to the bending axis.

In an embodiment, a length direction of the main slot is parallel to the direction of the bending axis.

In an embodiment, a component of the length of the main slot is equal to 0 in a direction in which the x-axis is located.

In an embodiment, the conducting layer is a transparent conducting film layer.

According to a sixth aspect, an electronic device is provided, including a bending axis and a screen module. The screen module can be bent along the bending axis. The screen module includes a flexible display screen, a touch control screen, and a cover that are disposed in sequence in a stacking manner. The touch control screen includes a conducting layer; the conducting layer includes a plurality of first grooves; the first groove includes a first end portion, a second end portion, and a main body portion that is located between the first end portion and the second end portion; a length of a projection of the first end portion on an x-axis is greater than a length of a projection, on the x-axis, of a part that is of the main body portion and that is in contact with the first end portion; a length of a projection of the second end portion on the x-axis is greater than a length of a projection, on the x-axis, of a part that is of the main body portion and that is in contact with the second end portion; the x-axis is perpendicular to the bending axis; and a plane in which the x-axis and the bending axis are located is a plane in which a surface of the touch control screen is located.

DESCRIPTION OF EMBODIMENTS

The following describes technical solutions of this application with reference to accompanying drawings.

First, related terms in this application are described.

"Parallel" or "perpendicular" described in this application can be construed as "approximately parallel" or "approximately perpendicular". For example, two directions with an included angle within a specified error range can be considered approximately parallel or approximately perpendicular. Correspondingly, "not parallel" or "not perpendicular" can be construed as "approximately not parallel" or "approximately not perpendicular".

The terms "first" and "second" are merely intended for a purpose of description, and shall not be understood as an indication or implication of relative importance or implicit indication of the number of indicated technical features. A feature limited by "first" or "second" may explicitly or implicitly include one or more features.

"At least one" means one or more, and "a plurality of" means two or more. "At least some elements" means some or all elements.

The following describes embodiments of this application.

This application can be applied to various electronic devices that are configured with a touch control screen, and in particular, can be applied to foldable electronic devices. Some or all areas of a foldable electronic device can be bent. In this application, the some or all areas that can be bent are referred to as bending areas. In an embodiment, the foldable electronic device can be folded or unfolded. When the foldable electronic device is folded, the electronic device is bent along a central axis. The central axis can be defined as a bending axis. In addition, a direction parallel to the bending axis can be defined as a bending axis direction, and the electronic device can be bent along the bending axis direction.

For ease of description, an x-axis, a y-axis, and a z-axis that are perpendicular to each other are defined in this application. The y-axis is parallel to the bending axis, the x-axis is perpendicular to the bending axis and is parallel to a plane in which a surface of the electronic device is located, the z-axis is perpendicular to both the x-axis and the y-axis, and a thickness direction of the electronic device is parallel to the z-axis.

Figure 1:
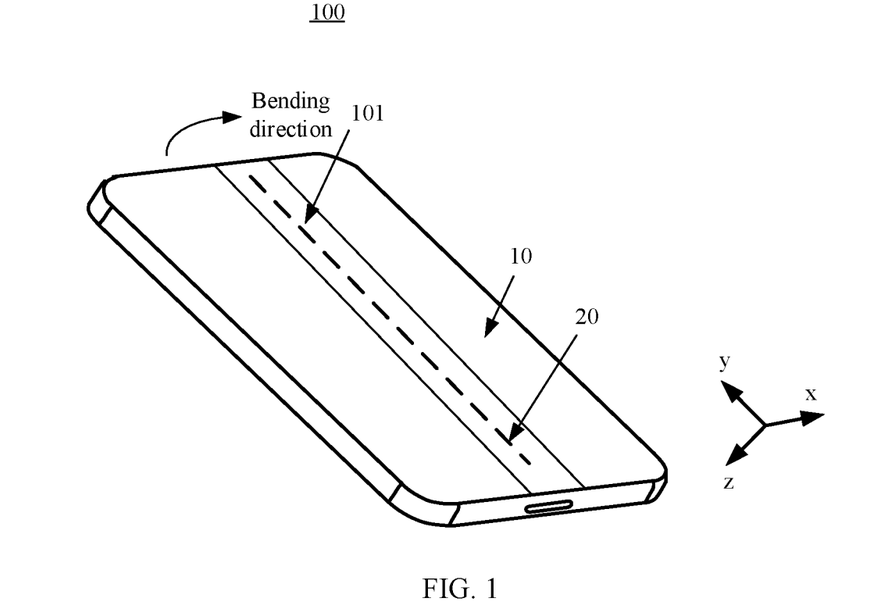
FIG. 1 is a possible schematic structural diagram of an electronic device according to an embodiment of this application.

FIG. 1 is a schematic structural diagram of an electronic device according to an embodiment of this application. Referring to FIG. 1, the electronic device 100 includes a screen module 10 and a bending axis 20. An area 101 is a bending area of the electronic device 100. The electronic device 100 can be bent along the bending axis 20.

Figure 2:
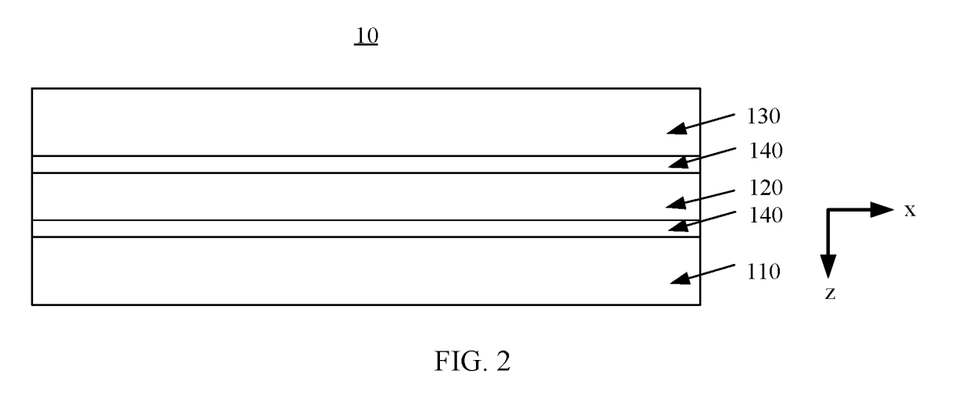
FIG. 2 is a possible schematic structural diagram of a screen module according to an embodiment of this application.

FIG. 2 is a schematic structural diagram of a screen module according to an embodiment of this application. The screen module can be applied to a foldable electronic device. Referring to FIG. 2, the screen module 10 includes a flexible display screen 110, a touch control screen 120, and a cover 130 that are stacked in sequence and bonded by using adhesive 140.

A touch control screen is also referred to as a "touchscreen" or a "touch control panel", and is an inductive liquid crystal display apparatus that can receive signals input from a contact and the like. Touch control screens are used in electronic devices such as mobile phones, e-books readers, and digital cameras. Capacitive touch control screens are widely applied due to advantages such as a long service life, a high transmittance, and high accuracy. A capacitive touch control screen operates by sensing current of a human body. When a user touches the touch control screen with a finger, a stylus, or the like, the touch control screen generates electric signal changes for manipulating an electronic device. The following describes this application by using a capacitive touch control screen as an example. It should be understood that this application not only can be applied to a capacitive touch control screen, but also can be applied to other touch control screens, for example, a resistive touch control screen. This is not limited in any manner in this application.

A touch control screen includes a transparent conducting layer with a graphical design. The graphical design may form a border separation slot and a groove in the transparent conducting layer. Each border separation slot is isolated from all other border separation slots and all grooves, and each groove is also isolated from all other grooves. A border separation slot can isolate two adjacent areas in the transparent conducting layer to form a circuit for implementing a touch control effect. The two areas may be both electrode areas, or one of the two areas may be an electrode area and the other area is a non-electrode area, or the two areas are both non-electrode areas. An electrode area is also referred to as a line area, and is an area in which a line for transmitting signals is located or an area in which a graph that embodies a logic circuit is located. A non-electrode area is also referred to as a dummy area. Although the non-electrode area also has graphs (or decorative patterns), these graphs (or decorative patterns) are irrelevant to the logic circuit, but are designed for consideration of light reflection and diffraction. The groove is provided in some or all areas in the transparent conducting layer except the border separation slot, to implement a touch control effect and a display effect.

Figure 3:
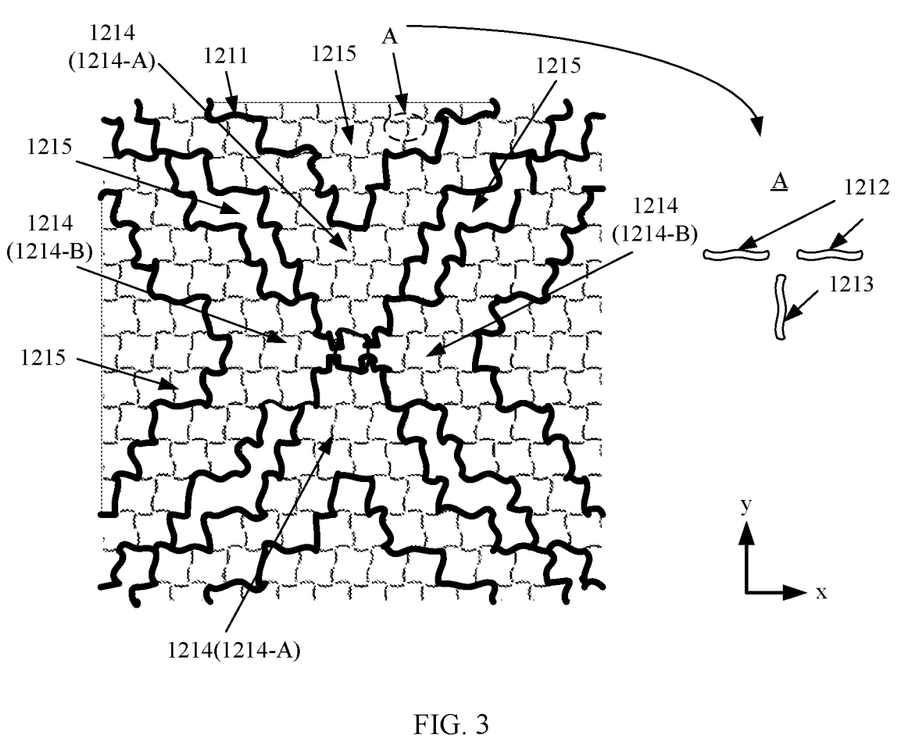
FIG. 3 is a schematic structural diagram of a local area of a transparent conducting layer in the prior art.

FIG. 3 is a schematic structural diagram of a local area of a transparent conducting layer. To avoid ambiguity, it should be noted that a border separation slot 1211 and a groove (1212 or 1213) shown in FIG. 3 are all drawn in single lines due to a limited size of the figure. Referring to FIG. 3, the transparent conducting layer includes electrode areas 1214 and non-electrode areas 1215 that are arranged in a spaced manner. Specifically, as shown in FIG. 3, when a non-electrode area 1215 is located at an edge of a local area of the transparent conducting layer, another side that is of the non-electrode area 1215 and that is located at a non-edge side is adjacent to an electrode area 1214. When a non-electrode area 1215 is located at an inner side of a local area of the transparent conducting layer, the non-electrode area 1215 is located between two electrode areas 1214 and is separately adjacent to the two electrode areas. It should be noted that in the embodiment corresponding to FIG. 3, each border separation slot 1211 is located between an electrode area 1214 and a non-electrode area 1215 that are adjacent to each other, and is configured to isolate the electrode area 1214 and the non-electrode area 1215 that are adjacent to each other.

It should be noted that, that each border separation slot 1211 shown in FIG. 3 is configured to isolate an electrode area 1214 and a non-electrode area 1215 that are adjacent to each other is merely one of the embodiments of this application. In this application, a border separation slot 1211 can isolate any two adjacent areas in the transparent conducting layer to form a circuit for implementing a touch control effect. The two areas may be both electrode areas, or one of the two areas may be an electrode area and the other area is a non-electrode area, or the two areas are both non-electrode areas.

Referring to FIG. 3 again, a plurality of electrode areas 1214-A that are electrically connected by using an electrode bridge and that are distributed along a y direction form one capacitive sensing module, and a plurality of electrode areas 1214-B that are connected to each other and that are distributed along an x direction form another capacitive sensing module. A capacitive effect exists between the two capacitive sensing modules. In a mainstream design at present, using the y-axis (e.g., a bending axis) as a reference direction, grooves may be divided into first-type grooves and second-type grooves based on components of lengths of the grooves on the y-axis. A component of a length of a first-type groove is greater than 0 on the y-axis. Alternatively, a length direction of a first-type groove is not perpendicular to the y-axis. In an embodiment, a length direction of a first-type groove is parallel to the y-axis, for example, a groove 1213 shown in FIG. 3. A component of a length of a second-type groove is equal to 0 on the y-axis, for example, a groove 1212 shown in FIG. 3.

It should be noted that a length direction of a groove can be construed as an extension direction from one end of the groove to the other end of the groove, regardless of a graphical design of the groove. In the extension direction, the groove may be of any shape. For example, as shown in FIG. 3, a length direction of a first-type groove is parallel to the x-axis, and the first-type groove is in a curved shape. A length direction of a second-type groove is parallel to the y-axis, and the second-type groove is also in a curved shape.

It should be understood that a length of a groove is greater than a width of the groove, where the length of the groove represents a size of the groove in a length direction of the groove, and the width of the groove represents a size of the groove in a width direction of the groove.

It should be further understood that due to reasons such as a processing error, that a component of a length of a second-type groove is equal to 0 on the y-axis can be construed as: the component of the length of the second-type groove is approximately equal to 0 on the y-axis. To be specific, when the component of the length of the second-type groove is less than a range threshold on the y-axis, it can be considered that the component of the length of the second-type groove is equal to 0 on the y-axis, for example, the groove 1212 shown in FIG. 3. Likewise, that a component of a length of a first-type groove is greater than 0 on the y-axis can also be construed as: the component of the length of the first-type groove is approximately greater than 0 on the y-axis. To be specific, when the component of the length of the first-type groove is greater than a range threshold on the y-axis, it can be considered that the component of the length of the first-type groove is greater than 0 on the y-axis. The interpretation herein is also applicable to the following descriptions of a relationship between a component of a main slot of a groove on an axis and 0. Details will not be described again.

Figure 4:
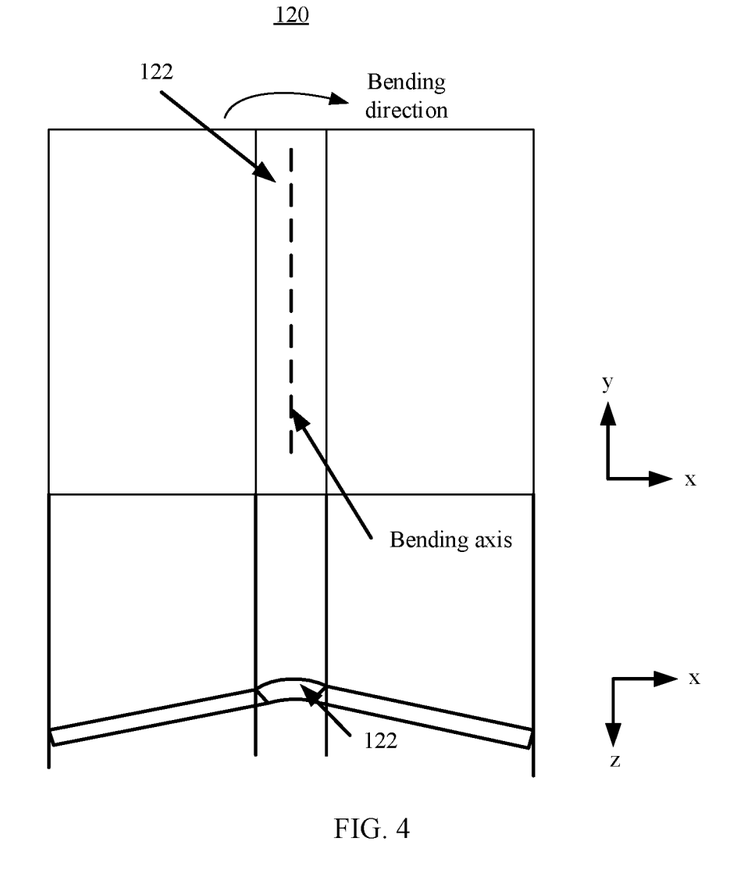
FIG. 4 is a schematic structural diagram of a touch control screen in a bent state according to an embodiment of this application.

In a foldable electronic device, a touch control screen can be bent along a bending axis, to fold or unfold the touch control screen. FIG. 4 is a schematic structural diagram of a touch control screen in a bent state according to this application. Referring to FIG. 4, an area 122 is a bending area of the touch control screen 120, and the dotted line indicates a bending axis.

When the electronic device is bent, film dislocation and internal stress occur in the bending area, and a transparent conducting layer in the bending area is subject to tensile force perpendicular to a bending axis direction or subject to tensile force in an x direction. Consequently, the transparent conducting layer in the bending area is prone to break, causing a line in the transparent conducting layer to disconnect or impedance to increase. Ultimately, a touch control effect of the touch control screen worsens or directly becomes ineffective, seriously compromising reliability of the touch control screen. In addition, an existing transparent conducting layer is usually prepared by using a transparent metal oxide, so that the transparent conducting layer has poor flexibility. As a result, the transparent conducting layer is more likely to break.

In this application, by analyzing a breakage phenomenon of transparent conducting layers, that when a transparent conducting layer in a bending area is subject to tensile force perpendicular to a bending axis direction, stress concentration occurs at an end portion of a first-type groove (for example, the groove 1213 shown in FIG. 3). This is an important factor that leads to breakage of the transparent conducting layer.

Based on the foregoing analysis, this application provides a touch control screen. An end portion of a first-type groove that is in a transparent conducting layer and whose component of length is greater than 0 on a y-axis is extended. This reduces stress concentration at the end portion of the groove, thereby improving reliability of the touch control screen. In addition, the touch control screen of this structure can be prepared simply by designing a pattern of a mask in advance. This features ease of operation and rapid deployment and is very practical.

In addition, for ease of description, a first-type groove in a conducting layer is denoted as a first groove below.

The following describes the touch control screen in this application in detail with reference to FIG. 5 to FIG. 9. It should be understood that structures in FIG. 5 to FIG. 9 are merely intended for illustration and do not limit this application.

Figure 5:
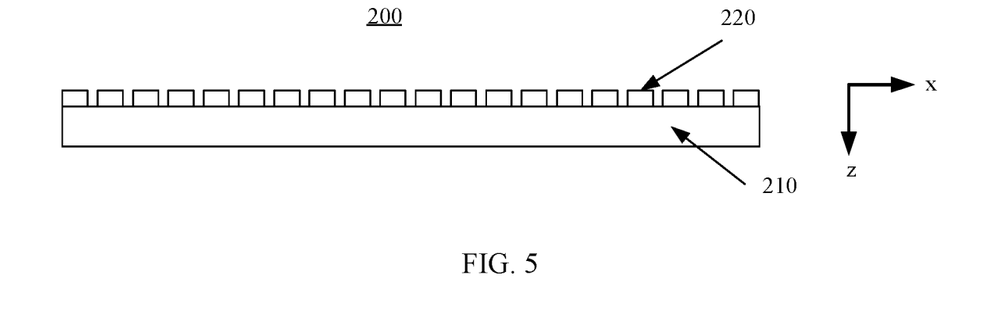
FIG. 5 is a schematic structural diagram of a touch control screen according to an embodiment of this application.
Figure 6:
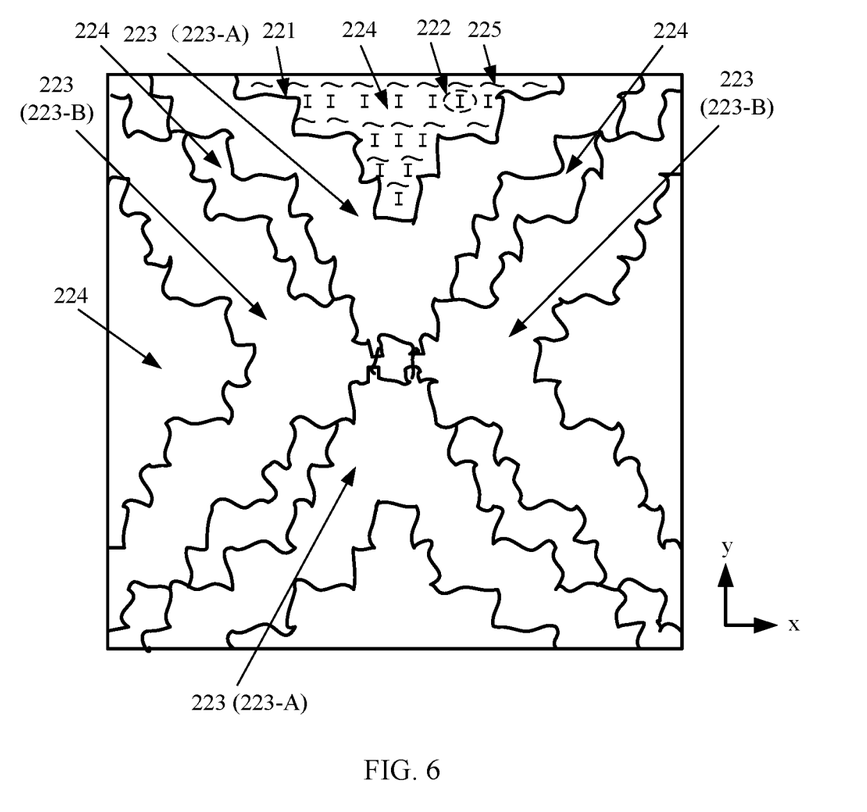
FIG. 6 is a schematic structural diagram of a local area of a conducting layer according to an embodiment of this application.

FIG. 5 is a schematic structural diagram of a touch control screen according to this application. FIG. 6 is a schematic structural diagram of a local area of a conducting layer according to this application. FIG. 7(a) to FIG. 7(k) are illustrative structural diagrams of a first groove according to this application. A border separation slot and a groove shown in FIG. 5 are all drawn in single lines due to a limited size of the figure.

Referring to FIG. 5, the touch control screen 200 includes a substrate 210 and a conducting layer 220 that are disposed in sequence in a stacking manner. The touch control screen 200 can be bent along a bending axis. Referring to FIG. 6, the conducting layer 220 includes at least one border separation slot 221 and at least one first groove 222 that are formed based on a graph. Optionally, the conducting layer 220 may further include a groove 225 whose component of length is equal to 0 on a y-axis (the bending axis). In other words, a length direction of the groove 225 is perpendicular to the y-axis. A border separation slot 221 is provided between two adjacent areas in the conducting layer 220 to isolate the two areas. The two areas are both electrode areas 223, or one of the two areas is an electrode area 223 and the other area is a non-electrode area 224 (where this case is not illustrated in the figure), or the two areas are both non-electrode areas (where this case is not illustrated in the figure).

Figure 7A:
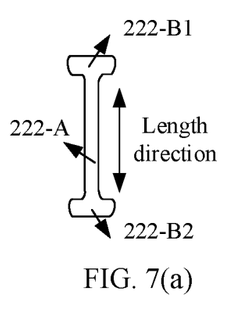
FIG. 7(a) to FIG. 7(k) are illustrative structural diagrams of a first groove according to an embodiment of this application.
Figure 7B:
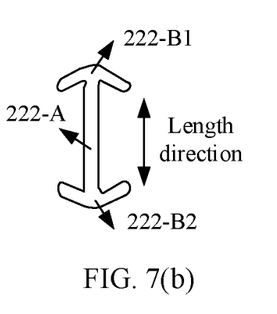
Figure 7C:
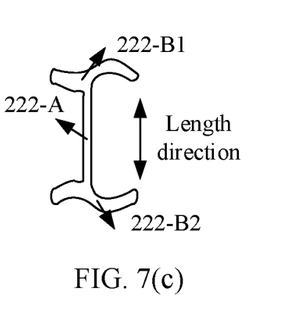
Figure 7D:
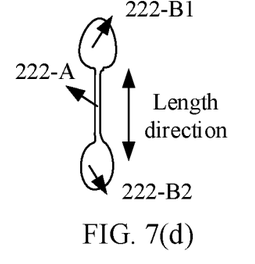
Figure 7E:
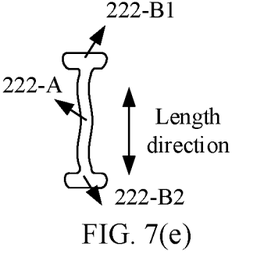
Figure 7F:
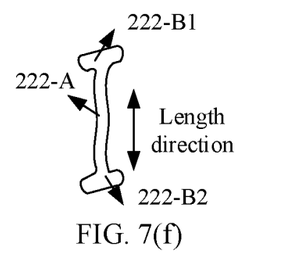
Figure 7G:
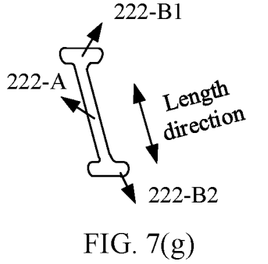
Figure 7H:
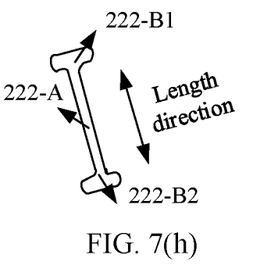
Figure 7I:
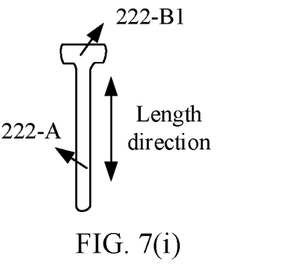
Figure 7J:
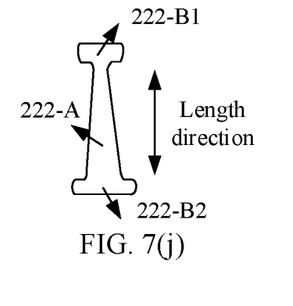
Figure 7K:
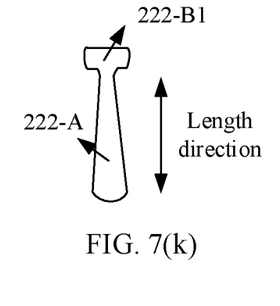

Referring to FIG. 7(a) to FIG. 7(k), the first groove 222 includes a main slot 222-A and one or two extension slots (an extension slot 222-B1 and/or an extension slot 222-B2). A component of a length of the main slot 222-A is greater than 0 in a direction in which the bending axis is located (namely a bending axis direction and a y direction), where the length of the main slot 222-A represents a size of the main slot 222-A in a length direction of the main slot 222-A. An extension slot may be provided at one end portion or two end portions of the main slot 222-A. Referring to FIG. 7(i) and FIG. 7(k), the first groove 222 has only one extension slot (for example, an extension slot 222-B1). The extension slot is connected to a first end portion of the main slot 222-A. A length of a projection of the extension slot on an x-axis is greater than a length of a projection of the first end portion of the main slot 222-A on the x-axis. Referring to FIG. 7(a) to FIG. 7(h), the first groove 222 has two extension slots (for example, an extension slot 222-B1 and an extension slot 222-B2). One extension slot (for example, the extension slot 222-B1) of the two extension slots is connected to a first end portion of the main slot 222-A, and the other extension slot (for example, the extension slot 222-B2) is connected to a second end portion of the main slot 222-A. A length of a projection of the one extension slot on an x-axis is greater than a length of a projection of the first end portion of the main slot 222-A on the x-axis. A length of a projection of the other extension slot on the x-axis is greater than a length of a projection of the second end portion of the main slot 222-A on the x-axis.

It should be understood that a length of the main slot is greater than a width of the main slot, where the length of the main slot represents a size of the main slot in a length direction of the main slot, and the width of the main slot represents a size of the main slot in a width direction of the main slot.

It should be noted that FIG. 6 shows only an example in which the first groove is provided in a non-electrode area. It can be clearly understood that the first groove in this application can be provided in any area in the conducting layer except the border separation slot. Any area may be some or all areas in the conducting layer except the border separation slot. This is not limited in any manner in this application.

In this way, an extension slot that can be connected to the main slot is provided at an end portion of the main slot, so that a length of a projection of the extension slot on the x-axis can be greater than a length of a projection, on the x-axis, of the end portion that is of the main slot and that is connected to the extension slot, where the x-axis is perpendicular to the bending axis. In this way, when the touch control screen is subject to tensile force from the x-axis in a bending process, stress originally concentrated on the relatively small end portion of the main slot is distributed to the relatively large extension slot, thereby reducing stress exerted on a single force bearing point on the extension slot that serves as an end portion of the first groove. This can effectively reduce stress concentration at the end portion of the first groove, thereby reducing a probability that the conducting layer breaks and improving reliability of the touch control screen. In addition, the touch control screen in this application can be prepared simply by designing a pattern of a mask in advance. This features ease of operation and rapid deployment and is very practical.

For descriptions of the border separation slot 221, the electrode area 223, and the non-electrode area 224, refer to the foregoing descriptions of these three terms. Details are not described herein again.

It should be noted that a graph of the border separation slot shown in FIG. 6 is merely intended for illustration and does not limit this application. Any graph for forming a border separation slot of a circuit falls within the protection scope of this application.

For ease of description, the following describes the first groove in this application in detail by using an example in which the first groove has an extension slot (which is denoted as a first extension slot 222-B1) that is connected to a first end portion of the main slot. The first end portion of the main slot is any one of two end portions of the main slot.

The component of the length of the main slot 222-A is greater than 0 on the y-axis. In other words, the main slot 222-A can be located in any direction provided that the length direction of the main slot 222-A is not perpendicular to the y-axis.

In an embodiment, referring to FIG. 7(a) to FIG. 7(f) and FIG. 7(i) to FIG. 7(k), the length direction of the main slot 222-A is parallel to the y-axis. In an embodiment, referring to FIG. 7(g) and FIG. 7(h), an included angle between the length direction of the main slot 222-A and the y-axis is greater than 0° and less than 90°.

Along the length direction of the main slot 222-A, a width of the main slot 222-A may be constant (as shown in any one of FIG. 7(a) to FIG. 7(i)), or may be inconstant (as shown in any one of FIG. 7(j) or FIG. 7(k)), in which case the width of the main slot 222-A changes progressively from one end to the other end. This is not limited in any manner in this application.

The first extension slot 222-B1 that is provided at the first end portion of the main slot 222-A is intended for increasing a size of an end portion of the first groove 222 on the x-axis. Therefore, a length of a projection of the first extension slot 222-B1 on the x-axis only needs to be greater than a length of a projection of the first end portion on the x-axis.

In an embodiment, a width direction of the first extension slot 222-A may be parallel to the x-axis (as shown in any one of FIG. 7(a) to FIG. 7(e) and FIG. 7(i) to FIG. 7(k)).

In this way, stress originally concentrated on the relatively small end portion of the main slot can be distributed to the relatively large extension slot to a relatively large degree. This can better reduce stress concentration at the end portion of the first groove, thereby reducing a probability that the conducting layer breaks and improving reliability of the touch control screen.

This application does not limit a structure of an extension slot in any manner. Any structure of an extension slot whose length of projection on the x-axis is greater than a length of a projection of an end portion of the main slot on the x-axis falls with the protection scope of this application.

In an embodiment, referring to FIG. 7(a) to FIG. 7(k), a shape structure of the first extension slot 222-B1 may be a linear structure shown in FIG. 7(a), or may be a curved structure shown in FIG. 7(b), FIG. 7(c), and FIG. 7(d). For example, the curved structure may be an S-shaped structure, an arc-shaped structure, a serpentine structure, a circular structure, a mushroom-shaped structure, or a barbell-shaped structure.

In an embodiment, the length of the projection of the first extension slot 222-B1 on the x-axis is greater than or equal to 1.5 times the length of the projection of the first end portion of the main slot 222-A on the x-axis. This can better reduce single-point stress on the end portion of the first groove, thereby better reducing stress concentration.

It should be understood that the foregoing 1.5 times is merely intended for illustration. The length of the projection of the first extension slot 222-B1 on the x-axis may alternatively be greater than or equal to any multiple, greater than 1, of the length of the projection of the first end portion of the main slot 222-A on the x-axis. By principle, within a designable range, a longer projection of the first extension slot 222-B1 on the x-axis is preferred. For example, the multiple greater than 1 may be 1.2, 1.3, 1.6, or 2.

It can be understood that when the width of the main slot 222-A remains basically constant, a width of the end portion of the main slot 222-A is the same as the width of the main slot 222-A. When the width direction of the first extension slot 222-B1 and the width direction of the main slot 222-A are both parallel to the x-axis, the length of the projection of the first extension slot 222-B1 on the x-axis can be considered as a width of the first extension slot 222-B1, and the length of the projection of the first end portion of the main slot 222-A on the x-axis can be considered as the width of the main slot 222-A.

Figure 8:
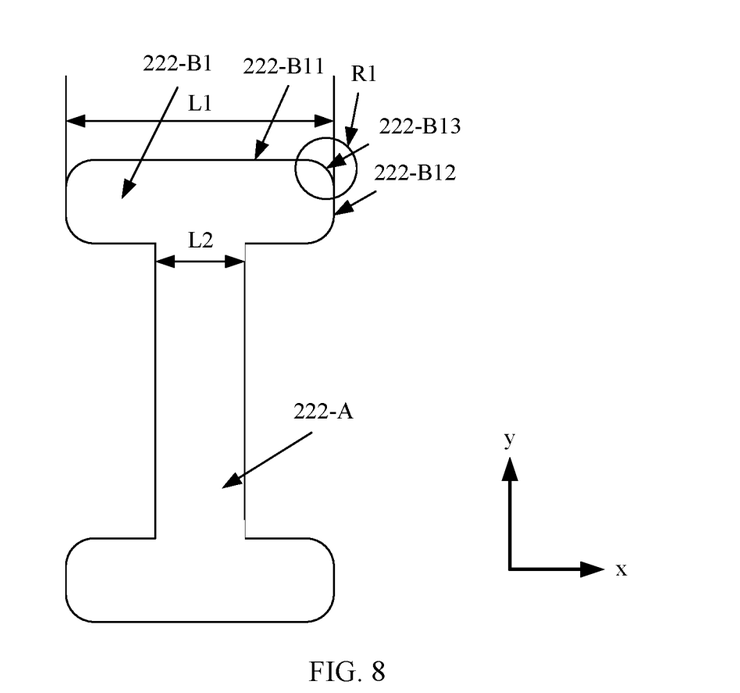
FIG. 8 is another illustrative structural diagram of a first groove according to an embodiment of this application.

For example, referring to FIG. 8, the width of the main slot 222-A remains basically constant, the width of the end portion of the main slot 222-A is basically the same as the width of the main slot 222-A, and the width direction of the main slot 222-A and the width direction of the first extension slot 222-B1 are parallel to the x-axis. It is assumed that the width of the end portion of the main slot 222-A is denoted as $L_2$, and that the width of the first extension slot 222-B1 is denoted as $L_1$. Then, $L_1 \geq 1.5 L_2$. For example, $L_2 = 20$ μm, and $L_1 = 40$ μm.

In an embodiment, at least a part of a slot wall of the first extension slot 222-B1 is an arc-shaped slot wall. The arc-shaped slot wall may be provided at any position of the first extension slot 222-B1.

In this way, the arc-shaped slot wall is provided in the extension slot. This can reduce stress concentration in a local range caused by a sudden change of a shape of the extension slot.

In an embodiment, the arc-shaped slot wall may be formed based on a chamfer design. The arc-shaped slot wall may be formed by implementing a chamfer design at an intersection of two adjacent slot walls. For example, referring to FIG. 8, the first extension slot 222-B1 includes a first slot wall 222-B11 and a second slot wall 222-B12 that are adjacent to each other. An arc-shaped slot wall 222-B13 connects the first slot wall 222-B11 and the second slot wall 222-B12. A radius of the arc-shaped slot wall 222-B13 may be denoted as $R_1$.

For example, a shape of the first extension slot 222-B1 may be a graph with a curve design. An extension slot including an arc-shaped slot wall can be formed through etching in a depth direction (a z direction) of the first extension slot 222-B1 based on the graph with a curve design. Optionally, a curvature radius of the arc-shaped slot wall is greater than 0.5 times a width of the first end portion that is of the main slot 222-A and that is connected to the first extension slot 222-B1. It is assumed that the curvature radius of the arc-shaped slot wall is denoted as ρ, and that the width of the end portion of the main slot 222-A is denoted as $L_2$.

Then, $$\rho > \frac{L_2}{2}$$

is satisfied.

Figure 9:
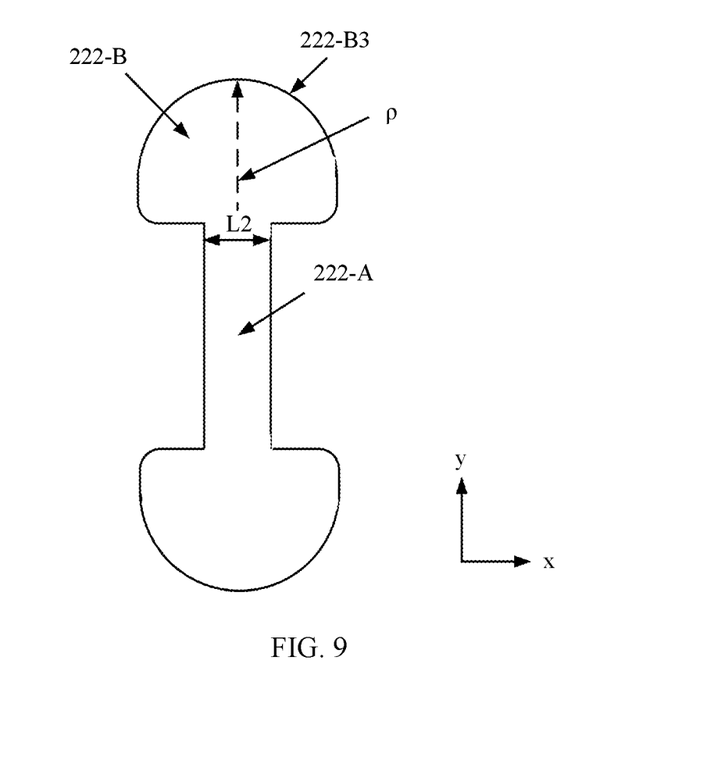
FIG. 9 is still another illustrative structural diagram of a first groove according to an embodiment of this application.

Referring to FIG. 9, a graph of a first extension slot 222-B is a graph with a curve design. A curvature radius of a curve is denoted as ρ. An extension slot including an arc-shaped slot wall 222-B3 is formed through etching in a depth direction (a z direction) of the first extension slot 222-B based on the graph of the first extension slot 222-B, where a curvature radius of the arc-shaped slot wall 222-B3 is ρ.

In an embodiment, the border separation slot 221 and the first groove 222 may be formed through etching on the conducting layer 220.

In an embodiment, the conducting layer 220 may be a transparent conducting layer. The transparent conducting layer may be a film layer made of transparent conducting film.

For example, a material of the transparent conducting layer may be, but is not limited to, any of the following types of conducting materials: indium tin oxide (ITO), antimony tin oxide, indium zinc oxide (IZO), zinc oxide (ZnO), carbon nanotube (carbon nanotube, CNT), silver (Ag), nanowire, conducting polymer, grapheme, and alloy material.

It should be noted that this application not only can be applied to a touch control screen with a display function for mobile phones or the like, and also can be applied to other touch control screens that do not need a display function. Therefore, the material of the conducting layer only needs to have a conductive effect.

In an embodiment, the substrate is a glass substrate, or may be made of polyethylene terephthalate (PET), polyimide (PI), a cured adhesive layer, or the like. This is not limited in any manner herein.

The following describes the first groove by using examples in which the first groove includes a main slot and an extension slot. The following describes the first groove by using an example in which the first groove includes an end portion and a main body portion.

Referring to FIG. 5, the touch control screen 200 includes a substrate 210 and a conducting layer 220 that are disposed in sequence in a stacking manner. The touch control screen 200 can be bent along a bending axis. Referring to FIG. 6, the conducting layer 220 includes a plurality of first grooves 222. The first groove 222 includes a first end portion 222-B1, a second end portion 222-B2, and a main body portion 222-A that is located between the first end portion 222-B1 and the second end portion 222-B2. A length of a projection of the first end portion 222-B1 on an x-axis is greater than a length of a projection, on the x-axis, of a part that is of the main body portion 222-A and that is in contact with the first end portion 222-B1. A length of a projection of the second end portion 222-B2 on the x-axis is greater than a length of a projection, on the x-axis, of a part that is of the main body portion 222-A and that is in contact with the second end portion 222-B2.

The main body portion 222-A may correspond to the foregoing main slot 222-A. End portions of the first groove 222 may correspond to the foregoing extension slots. Specifically, the first end portion 222-B1 of the first groove 222 may correspond to the foregoing first extension slot 222-B1. The part that is of the main body portion 222-A and that is in contact with the first end portion 222-B1 may correspond to the foregoing first end portion of the main slot 222-A. The second end portion 222-B2 of the first groove 222 may correspond to the foregoing second extension slot 222-B2. The part that is of the main body portion 222-A and that is in contact with the second end portion 222-B2 may correspond to the foregoing second end portion of the main slot 222-A. For specific descriptions of the parts of the first groove, refer to related descriptions above. Details are not described herein again.

Figure 10:
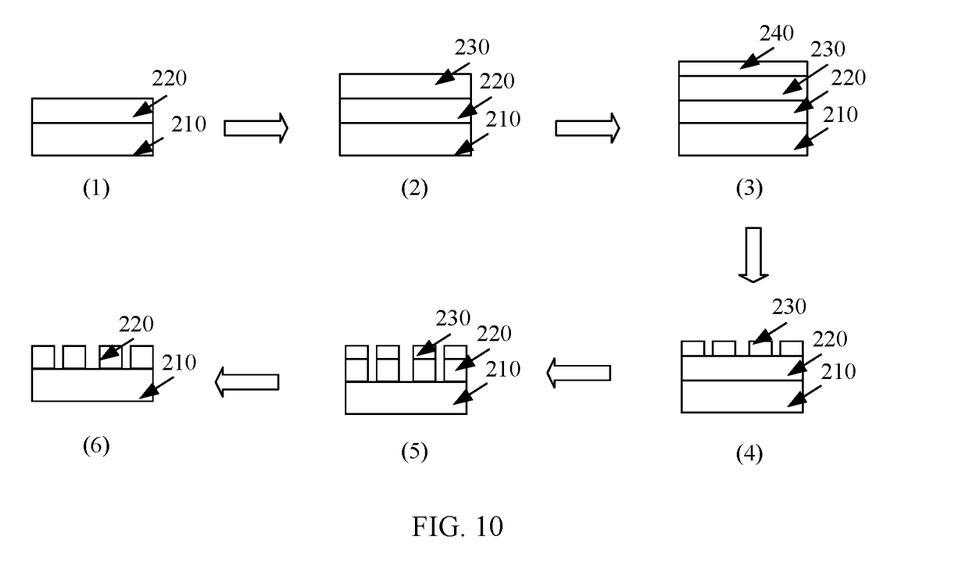
FIG. 10 is a possible schematic flowchart of a graphical design of a conducting layer according to an embodiment of this application.

The following describes an example of a graphical design procedure of a conducting layer according to this application with reference to FIG. 10. It should be understood that other manners that can produce a conducting layer are also applicable. FIG. 10 is merely intended for illustrative purposes. The procedure in FIG. 10 can be divided into six operations, which are described in detail below:

Operation 1 (1). Form an even layer of transparent conducting film 220 on a substrate 210 by using physical vapor deposition (PVD), chemical vapor deposition (CVD), or other film forming technologies, to form the conducting layer.

Operation 2 (2). Form a layer of photoresist film 230 on the transparent conducting film 220 by using a coating technology.

Operation 3 (3). Place the substrate 210 into an exposure machine and expose the photoresist film 230 by using light with a specific wavelength and power based on a designed mask 240, where a pattern on the mask 240 includes a border separation slot and a first groove with an extension slot that are described above.

Operation 4 (4). After exposure of the photoresist film 230 is completed, perform development in a special development process and remove some photoresist adhesive to form a graph on the photoresist film.

Operation 5 (5). Etch on the transparent conducting film 220 by using an etching process, to transfer a pattern on the photoresist film to the transparent conducting film 220.

Operation 6 (6). Remove the photoresist film 230 from the transparent conducting film 220, to prepare a graph on the transparent conducting film 220 and produce transparent conducting film that includes the border separation slot and the first groove.

This application further provides a screen module. Referring to FIG. 2, the screen module 10 includes a flexible display screen 110, a touch control screen 120, and a cover 130 that are stacked in sequence. The touch control screen 120 includes a substrate and a conducting layer. For specific descriptions, refer to the detailed descriptions of the touch control screen 200. Details are not described herein again.

This application further provides an electronic device. Referring to FIG. 1, the electronic device 100 includes a bending axis 20 and a screen module 10. The screen module 10 can be bent along the bending axis 20, so that the electronic device that includes the screen module 10 can be folded or unfolded. Referring to FIG. 2, the screen module 10 includes a flexible display screen 110, a touch control screen 120, and a cover 130 that are disposed in sequence in a stacking manner. For specific descriptions of the touch control screen 120, refer to the detailed descriptions of the touch control screen 200. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A touch control screen capable of being bent along a bending axis, comprising:
a conducting layer having a plurality of border separation slots and a plurality of grooves, the plurality of grooves being disposed in all areas in the conducting layer except the plurality of border separation slots, the plurality of grooves including a plurality of first grooves and a plurality of second grooves, each first groove of the plurality of first grooves having a length direction not perpendicular to the bending axis and comprising a main slot and a first extension slot connected to a first end portion of the main slot, wherein a component of a length of the main slot is greater than 0 in a direction in which the bending axis is located, wherein a length of a projection of the first extension slot is greater than a length of a projection of the first end portion in a direction perpendicular to the bending axis, wherein an x-axis is perpendicular to the bending axis, wherein a plane in which the x-axis and the bending axis are located is a plane in which a surface of the touch control screen is located, wherein the plurality of border separation slots comprise a first border separation slot located between an electrode area and a non-electrode area that are adjacent to each other, and wherein the first border separation slot is configured to isolate the electrode area and the non-electrode area.

2. The touch control screen according to claim 1, wherein the length of the projection of the first extension slot on the x-axis is greater than or equal to 1.5 times the length of the projection of the first end portion on the x-axis.

3. The touch control screen according to claim 1, wherein at least a part of a slot wall of the first extension slot is an arc-shaped slot wall.

4. The touch control screen according to claim 3, wherein the arc-shaped slot wall is formed based on a chamfer design.

5. The touch control screen according to claim 3, wherein a curvature radius of the arc-shaped slot wall is greater than 0.5 times a width of the first end portion.

6. The touch control screen according to claim 1, wherein each first groove further comprises a second extension slot connected to a second end portion of the main slot, wherein a length of a projection of the second extension slot on the x-axis is greater than a length of a projection of the second end portion on the x-axis.

7. The touch control screen according to claim 1, wherein the conducting layer further comprises a second border separation slot disposed between two adjacent areas in the conducting layer to isolate the two adjacent areas, wherein the two adjacent areas are both electrode areas, or the two adjacent areas are both non-electrode areas; and the first groove is provided in at least a part of an area in the conducting layer except the second border separation slot.

8. The touch control screen according to claim 1, wherein a component of the length of the main slot is equal to 0 in a direction in which the x-axis is located.

9. The touch control screen according to claim 1, wherein the conducting layer is a transparent conducting layer.

10. A touch control screen capable of being bent along a bending axis, comprising:
a conducting layer having a plurality of border separation slots and a plurality of grooves, the plurality of grooves being disposed in all areas in the conducting layer except the plurality of border separation slots, the plurality of grooves including a plurality of first grooves and a plurality of second grooves, each first groove of the plurality of first grooves having a length direction not perpendicular to the bending axis and comprising a first end portion, a second end portion, and a main body portion that is located between the first end portion and the second end portion, wherein, in a direction perpendicular to the bending axis, a length of a projection of the first end portion is greater than a length of a projection of a first part that is of the main body portion and that is in contact with the first end portion, wherein, in a direction perpendicular to the bending axis, a length of a projection of the second end portion is greater than a length of a projection of a second part that is of the main body portion and that is in contact with the second end portion, wherein an x-axis is perpendicular to the bending axis, wherein a plane in which the x-axis and the bending axis are located is a plane in which a surface of the touch control screen is located, wherein the plurality of border separation slots comprises a first border separation slot located between an electrode area and a non-electrode area that are adjacent to each other, and wherein the first border separation slot is configured to isolate the electrode area and the non-electrode area.

11. A screen module, comprising:
a flexible display screen;
a touch control screen capable of being bent along a bending axis, wherein the touch control screen comprises a conducting layer having a plurality of border separation slots and a plurality of grooves, the plurality of grooves being disposed in all areas in the conducting layer except the plurality of border separation slots, the plurality of grooves including a plurality of first grooves and a plurality of second grooves, each first groove of the plurality of first grooves having a length direction not perpendicular to the bending axis and comprising a main slot and a first extension slot connected to a first end portion of the main slot, wherein a component of a length of the main slot is greater than 0 in a direction in which the bending axis is located, wherein a length of a projection of the first extension slot is greater than a length of a projection of the first end portion in a direction perpendicular to the bending axis, wherein an x-axis is perpendicular to the bending axis, and wherein a plane in which the x-axis and the bending axis are located is a plane in which a surface of the touch control screen is located; and
a cover, wherein the flexible display screen, the touch control screen and the cover are disposed in sequence in a stacking manner; or
a flexible display screen;
a touch control screen capable of being bent along a bending axis, wherein the touch control screen comprises a conducting layer having a plurality of border separation slots and a plurality of grooves, the plurality of grooves being disposed in all areas in the conducting layer except the plurality of border separation slots, the plurality of grooves including a plurality of first grooves and a plurality of second grooves, each first groove of the plurality of first grooves having a length direction not perpendicular to the bending axis and comprising a first end portion, a second end portion, and a main body portion that is located between the first end portion and the second end portion, wherein, in a direction perpendicular to the bending axis, a length of a projection of the first end portion is greater than a length of a projection of a first part that is of the main body portion and that is in contact with the first end portion, wherein, in a direction perpendicular to the bending axis, a length of a projection of the second end portion is greater than a length of a projection of a second part that is of the main body portion and that is in contact with the second end portion, wherein an x-axis is perpendicular to the bending axis, wherein a plane in which the x-axis and the bending axis are located is a plane in which a surface of the touch control screen is located, wherein the plurality of border separation slots comprises a first border separation slot located between an electrode area and a non-electrode area that are adjacent to each other, and wherein the first border separation slot is configured to isolate the electrode area and the non-electrode area; and a cover, wherein the flexible display screen, the touch control screen and the cover are disposed in sequence in a stacking manner.

12. The screen module according to claim 11, wherein the length of the projection of the first extension slot on the x-axis is greater than or equal to 1.5 times the length of the projection of the first end portion on the x-axis.

13. The screen module according to claim 11, wherein at least a part of a slot wall of the first extension slot is an arc-shaped slot wall.

14. The screen module according to claim 13, wherein the arc-shaped slot wall is formed based on a chamfer design.

15. The screen module according to claim 13, wherein a curvature radius of the arc-shaped slot wall is greater than 0.5 times a width of the first end portion.

16. The screen module according to claim 11, wherein each first groove further comprises a second extension slot connected to a second end portion of the main slot, wherein a length of a projection of the second extension slot on the x-axis is greater than a length of a projection of the second end portion on the x-axis.

17. The screen module according to claim 11, wherein the conducting layer further comprises a second border separation slot disposed between two adjacent areas in the conducting layer to isolate the two adjacent areas, the two adjacent areas are both electrode areas, or the two adjacent areas are both non-electrode areas; and the first groove is provided in at least a part of an area in the conducting layer except the second border separation slot.

18. The screen module according to claim 11, wherein a component of the length of the main slot is equal to 0 in a direction in which the x-axis is located.

19. The screen module according to claim 11, wherein the conducting layer is a transparent conducting layer.

20. An electronic device, comprising a bending axis and the screen module according to claim 11, wherein the screen module can be bent along the bending axis.

* * * * *